Patented Sept. 24, 1935

2,015,083

UNITED STATES PATENT OFFICE 2,015,083

SYNTHETIC RESIN AND METHOD OF PREPARING THE SAME

William Henry Moss, Cumberland, Md., assignor to Celanese Corporation of America, a corporation of Delaware No Drawing. Application November 7, 1929, Serial No. 405,536

3 Claims. (Cl. 260—2)

This invention relates to the preparation of a synthetic resin from a dihydroxy benzene and a ketone, and also to coating or plastic compositions containing derivatives of cellulose and particularly organic derivatives of cellulose.

An object of my invention is to prepare a synthetic resin that is compatible with derivatives of cellulose, and therefore suitable for use in films, lacquers or other coating compositions or plastics containing such derivatives of cellulose.

A further object of my invention is to provide a suitable resin for lacquers or plastic compositions containing derivatives of cellulose, which resin is compatible with the other constituents of the lacquers and which produces clear solutions which upon drying form films that are adherent, tough and hard and water-repellent.

The preparation of a lacquer containing organic derivatives of cellulose such as cellulose acetate as the main constituent of the lacquer base, which lacquer is to be applied to a hard, smooth surface presents many difficulties. This is due primarily to the fact that films from lacquers containing cellulose acetate as the sole constituent of the lacquer base do not adhere to smooth surfaces. When attempts are made to incorporate natural gums or resins in the lacquer containing cellulose acetate in order to impart the necessary adhesive qualities to the film produced from it, both the lacquer and the film produced therefrom become cloudy and unhomogeneous.

I have found that synthetic resins produced by the condensation of a ketone with a dihydroxy benzene in the presence of a suitable catalyst are compatible with cellulose acetate, and that when added to lacquers containing cellulose acetate they form clear solutions that upon drying produce clear, hard and tough and firmly adherent films.

In accordance with my invention, I prepare special synthetic resins formed by the reaction of a ketone with a dihydroxy benzene such as resorcin or similar meta-dihydroxybenzene in the presence of a suitable catalyst, preferably a strong acid such as hydrochloric, sulfuric, or phosphoric acid. These synthetic resins are then used for making a lacquer or plastic composition which contains one or more derivatives of cellulose and a volatile solvent. The lacquer may contain also one or more natural or semi-synthetic resins or gums, one or more plastifiers or softening agents, medium and/or high boiling point solvents and preferably, but not necessarily, some pigments and/or dyes.

Solutions thus formed may be employed as a lacquer or coating composition for metal, glass or other surfaces and may be used for making photographic or other films. Artificial yarns may be formed by extruding the solution containing the derivative of cellulose and the special resin through the orifices of a spinneret, either into a heated evaporative atmosphere as in dry spinning, or into a precipitating bath as in wet spinning. The solution may also be employed as an adhesive, and is particularly useful in this connection for making shatterless glass by causing celluloid sheets to adhere to surfaces of sheets of glass between which they are placed.

The plastic composition containing derivatives of cellulose and the special resin may be worked into sheets which may also be used for laminated glass, and also may be worked into blocks or articles in any known manner.

The derivative of cellulose that may be used for making the solutions for coating or plastic compositions comprises any suitable derivative, such as cellulose nitrate or organic derivatives of cellulose. Examples of organic derivatives of cellulose are organic esters of cellulose such as cellulose acetate, cellulose formate, cellulose propionate and cellulose butyrate or cellulose ethers such as ethyl cellulose, methyl cellulose and benzyl cellulose.

The low boiling point solvent that may be employed may be one or a mixture of two or more of the following: Acetone, alcohol, benzene or ethylene dichloride. Examples of medium and/or high boiling point solvents are ethyl acetate, ethyl lactate, tetrachlorethane, benzyl alcohol or diacetone alcohol. Of course it is understood that the choice of the solvents depends on the solubility characteristics of the particular derivative of cellulose employed. Examples of suitable plastifiers are diphenylol propane, triacetin, dibutyl tartrate, diethyl phthalate, mono methyl xylene sulfonamid. If desired, fire retardants may be added, particularly the very effective bromine derivatives of organic compounds, such as brominated tricresyl phosphate. The pigments or dyes that may be used may be those ordinarily employed in the paint or lacquer industry.

Of the natural gums or resins that may be added, the following may be mentioned: manila, accaroides, pontianak, kauri, dammar, rosin and shellac. The semi-synthetic resin, ester gum, which is the glycerol ester of rosin may be also added. If desired, synthetic resins, other than the special ketone-dihydroxybenzene resin may be employed in conjunction therewith, and examples of these are the fusible and soluble phenol-formaldehyde or diphenylol propane-formaldehyde resins preferably prepared in the presence of acid catalysts.

The special synthetic resin employed in this invention may be prepared by the condensation of a ketone with a dihydroxy benzene in the presence of a suitable catalyst such as hydrochloric acid. While I prefer to use acetone as one of the reactants any other suitable ketone, such as methyl ethyl ketone, diethyl ketone, cyclohexanone, or methyl cyclohexanone may be used. The ketone is condensed with a dihydroxy benzene. Of the three dihydroxy benzenes, I have found that the meta compound, resorcin, produces the best results.

As examples of making the resins the following is given:

Example A

| | Parts |
|---|---|
| Resorcin | 50 |
| Acetone | 100 |
| Concentrated hydrochloric acid | 50 |
| or | |
| Sulphuric acid | 25 |
| or | |
| Phosphoric acid | 50 | are mixed together and heated at about 50° C. under reflux. A yellow oil first separates and gradually changes to a yellowish-pink resin.

The reaction is completed by allowing the mixture to stand for 24 hours at ordinary temperature, when the resin gradually hardens. If desired, the same hardening may be brought about by heating to 60–70° C. for about 1 hour. The resin may be purified by distillation either under vacuum or at ordinary pressure or by steam distillation, and/or it may be washed in water or dilute solutions of caustic soda or other alkali, or it may be washed with water containing small amounts of acetone, alcohol or other organic solvents. It may be fused at the end of this washing period to produce a clear, transparent resin with a melting point of about 120° C. This resin is soluble in acetone, alcohol and benzene and most of the common solvents for cellulose acetate, and is compatible with cellulose acetate in both solution and film. It may be used in cellulose acetate compositions for protective coatings or in films, plastics, artificial yarns, etc.

Example B

In the above example, methyl ethyl ketone is used in place of acetone, and a resin almost identical in properties with the above is produced.

Example C

Cyclohexanone is used in place of acetone in Example A and a similar yellow resin is formed. If this yellow resin is allowed to stand for 24 hours before washing or steam distillation it turns blue and gives a blue solution in acetone. On washing and fusing a resin is produced which is a little darker in color than that from acetone and resorcin.

Example D

Methyl butyl ketone is used in place of acetone and a resin similar to the above, but not so compatible with cellulose acetate, is produced.

It is to be understood that the foregoing detailed description is given merely by way of illustration, and that many variations may be made therein, without departing from the spirit of my invention.

Having described my invention, what I claim and desire to secure by Letters Patent is:

1. Method of preparing a synthetic resin which comprises reacting approximately four molecular proportions of acetone with approximately one molecular proportion of resorcin in the presence of a relatively large amount of strong acid as catalyst at a temperature of about 50° C. to produce a liquid condensation product, and heating said product at 60° to 70° C. for at least one hour.

2. Method of preparing a synthetic resin which comprises reacting approximately four molecular proportions of acetone with approximately one molecular proportion of resorcin in the presence of a relatively large amount of strong acid as catalyst at a temperature of about 50° C. to produce a liquid condensation product, and allowing said product to stand at atmospheric temperature for at least twenty-four hours.

3. A resin produced in accordance with the process of claim 1, said resin being compatible with cellulose acetate.

WILLIAM HENRY MOSS.